3,730,909
HYDRAZINE DECOMPOSITION CATALYST
Warren E. Armstrong, Lafayette, and Hervey H. Voge, Berkeley, Calif., assignors to Shell Oil Company, New York, N.Y.
No Drawing. Filed Apr. 5, 1966, Ser. No. 540,413
Int. Cl. B01j 11/82
U.S. Cl. 252—434                                 5 Claims

ABSTRACT OF THE DISCLOSURE

Improved catalysts for the decomposition of hydrazine and lower alkyl-substituted hydrazines comprise a platinum group metal catalyst in combination with a solid oxidizer hypergolic on a porous, inorganic solid support.

---

This invention relates to catalytic decomposition of hydrazine and lower alkyl-substituted hydrazines. It deals with new and improved catalysts for carrying out these decompositions more advantageously, especially in rockets and the like.

Hydrazine and lower alkyl-substituted hydrazines have found extensive application as gas generants in supersonic vehicles. They not only serve as monopropellant fuels for rockets but also are used in operation of auxiliary powder plants for guided missiles and the like. A variety of hydrazine decomposition catalysts have been suggested for use in these devices. Catalysts containing platinum group metals have been proposed in U.S. Pats. 3,081,595 and 3,086,945, for example, and especially effective hydrazine decomposition catalysts of this type are described in our copending application Ser. No. 371,879, filed May 28, 1964. These catalysts have the advantage over previous catalysts of providing repeated cold starts with less than 50 millisecond delay and without appreciable overpressure at the start. The cost of these catalysts is relatively high, but is well warranted because of the infallible operation they provide under the adverse conditions of use in space.

There is need for a cheaper catalyst having the same advantageous low temperature starting characteristics for use where a long effective life or repeated use are not required. An important object of the present invention is the provision of a new type of hydrazine decomposition catalyst which supplies this need. A more particular object is to provide catalysts especially for use in missiles having only a relatively short operating period. A special object is the provision of a reasonably priced catalyst suitable for decomposing hydrazine in the guidance mechanism of missiles where only one low temperature start will be required but having sufficient catalytic activity to sustain decomposition after that start and to give repeated starts at the higher catalyst temperature which will exist during the remainder of the flight. Other objects and advantages of the invention will be apparent from the following description.

The novel and advantageous hdyrazine decomposition catalysts of the invention comprise a platinum group metal catalyst in combination with a solid oxidizer hypergolic with hydrazine and the lower-alkyl hydrazines, the mixture being carried on a porous solid support. It has been found that with combination catalysts of this type only a small amount of platinum group metal is necessary to obtain effective starts at temperatures as low as 0° F. with a liquid hydrazine or blends thereof with other materials. The catalyst has sufficient permanent activity to sustain the required decomposition and to give repeated starts at the temperatures of about 200° C. or above which are maintained in the catalyst for an appreciable time after stopping the decomposition. As a result the catalyst functions efficiently throughout the entire time required for the missile to complete its trajectory.

Any of the six platinum group metals or mixtures thereof may be used in preparing the new spontaneous catalysts for decomposition of the hydrazines. Ruthenium, rhodium, palladium, osmium, iridium, and/or platinum are all effective decomposition catalysts. It has been found that ruthenium offers special advantages and for this reason it will be emphasized in the following illustrative examples, but this is only for the sake of simplifying the description of the invention, and it will be understood that the other platinum group metals can be similarly used in place of or together with the ruthenium in the catalysts chosen as illustrations.

As solid oxidizing agents for use with the chosen platinum group metal or metal mixture, one will use oxidants which are hypergolic with the hydrazine which is to be decomposed, and stable with respect to the catalyst support which is employed. A variety of suitable oxidants are available. Typical oxidizers are, for instance, chromates, dichromates, manganates, permanganates, chlorates, perchlorates, nitrates, and the like. For the sake of economy these are advantageously used in the form of their alkali metal or ammonium salts, but other salts have been successfully used in hydrazine decomposition. Silver salts, for example silver chlorates, perchlorates, chromates and nitrates have been successfully used in decomposing hydrazine, and other salts such as alkaline earth metal salts, lead salts, zinc salts, etc., can also be used. Solid halo-oxy acids such as iodic acids and the like are another suitable type of oxidizing agents which can be used in the new catalysts. It has been found that there are special advantages in the use of ammonium dichromate and iodic acid as oxidizers because they combine high effectiveness with good stability, freedom from detonation danger, and reasonable cost.

The mixture of platinum group metal and hypergolic oxidizer are used on a porous carrier which should be substantially inert under the hydrazine decomposition conditions used. Carriers which have a moderately high specific area, of the order of 10 or more square meters per gram, are particularly useful. Supports having a pore volume of at least 0.1 cubic centimeter per gram are desirable in order to provide capacity for the desired amounts of platinum group metal catalyst and associated oxidizer. Those with pore volumes between about 0.2 and about 0.8 cubic centimeter per gram are especially advantageous. Alumina supports, especially the highly stable forms derived from gels, such as for instance gelatinous boehmite, are particularly advantageous. However, other porous oxides such, for example, as zirconia, titania, silica gel, and the like, can be used as well as carbides such, for instance, as boron carbide, silicon carbide, zirconium carbide, etc., and nitrides as for example, titanium nitride, zirconium nitride, and boron nitride. Other porous, highly refractory carriers such as carbon, and the like, can also be employed successfully in making the new catalysts, as can ceramic supports of various types.

The proportions of platinum group metal and hypergolic oxidizer to each other and to the weight of carrier can be varied rather widely. The amount of oxidizer should be at least sufficient to raise the temperature of the catalyst and incoming liquid hydrazine and/or substituted hydrazine to at least about 100° C., and more advantageously, to about 150° to about 200° C. Amounts of oxidizer which supply about 1% to about 20% active oxygen based on the total weight of the catalyst are suitable as a general rule. Good hypergolic starts have been obtained with hydrazine flow rates of about 0.1 to about 1.0 pound per second per pound of catalyst when using a platinum group metal catalyst with an alumina carrier having about 2 to about 10% by weight active oxygen content.

A minimum of platinum group metal of about 0.2% wt. is usually desirable to insure complete decomposition in rapid repeated warm starts. Amounts greater than 4% wt. are not needed and unnecessarily add to the cost of the catalyst. Good results can be obtained with amounts between about 0.5% and 3% wt., with amounts between about 1% and about 2% being generally advantageous.

The catalysts can be manufactured by different methods. In one suitable method, the platinum group metal is first deposited on the carrier using any of the techniques known for this purpose. The platinum metal-containing carrier is then treated to incorporate the chosen oxidizer or mixture of oxidizers. Alternatively the oxidizer can be admixed with the carrier prior to incorporating the platinum group metal but this is usually less advantageous as is also the simultaneous incorporation of both platinum group metal and oxidizer but these methods can nevertheless be employed.

For deposition of the platinum group metal, one can, for example, impregnate the carrier with a suitable solution of a platinum group metal compound, and when sufficient of the compound has been adsorbed by the carrier, convert the compound to platinum group metal. Solutions of soluble salts of platinum group metals are advantageous for impregnating the carrier. Chlorides have proven especially useful forms of the salts. Typical chlorides which can be used are, for instance, iridium chlorides such as $H_2IrCl_6$, $H_3IrCl_6$, $HIrCl_2(OH)_2$, $IrCl_3 \cdot H_2O$, $(NH_4)_3IrCl_6$, $(NH_4)_2IrCl_5(H_2O)$, $[Ir(NH_3)_4Cl_2]Cl$ and $[Ir(NH_3)_5(H_2O)]Cl_3$. Similar salts of platinum, osmium, rhodium, ruthenium and palladium can be used in the same way. Particularly good results can be obtained with ruthenium salts such for example, as $RuCl_3$, $RuCl_4$, $H_3RuCl_6$, $(NH_4)_2RuCl_6$, and $[Ru(NH_3)_4Cl_2]Cl$. Acidic salt solutions are especially advantageous.

Water alone, or aqueous or anhydrous alcohols can be used as solvents in making up the solutions of platinum group metal salts. Preferred alcohols are the water miscible alcohols such as methanol, ethanol, isopropyl alcohol, tertiary butyl alcohol, etc. As a general rule solutions are used which contain amounts of salt providing about 0.02 to about 1 gram atoms of the platinum group metal or metal or metal mixture per liter; more advantageously about 0.1 to about 0.6 gram atoms per liter.

The chosen catalyst carrier can be immersed in the solution of catalyst metal salt until the desired amount of salt has been incorporated in the carrier. Usually about 10 to 40 minutes immersion is sufficient after which the excess solution can be drained off and the carrier dried. It is generally not essential that the solution saturate all the interior pores of the catalyst, but there should be sufficient solution incorporated in the carrier to insure an adequate deposit of platinum group metal on subsequent decomposition and/or reduction of the platinum group metal salt.

Decomposition of the deposited salt can be effected conveniently by gradually heating the partly dried carrier to about 250° to about 450° C. Heating for about 10 to about 60 minutes is usually sufficient to complete the decomposition sufficiently before reduction of the decomposition products is carried out. Reduction by heating with hydrogen at about 150° to about 600° C. is one suitable method of converting the deposit on the carrier to the active metallic form of platinum group metal desired as catalyst.

The oxidizer can be incorporated in the catalyst by using a suitable solution which will be adsorbed by the platinum group metal-containing carrier. Aqueous solutions of the previously described oxidizers can be used satisfactorily as can also solutions in other solvents such as alcohols, etc., especially those described above for use in applying the platinum group metal salts. Another method of applying the oxidizer which has the advantage of depositing a higher proportion on the exterior surface where it is more effective, comprises first saturating the platinum group metal-containing catalyst carrier with water or other volatile solvent for the chosen oxidizer or mixture of oxidizers. The carrier is then intimately mixed with the oxidizer in highly concentrated solution or in finely divided solid from so that sufficient oxidizer adheres to the carrier to supply the previously discussed required proportion. With both of these methods of applying the oxidizer, one finally dries the catalyst to substantially remove the water or other solvent employed, and to obtain a catalyst having on the carrier a deposit of platinum group metal together with a solid oxidizer hypergolic with the hydrazine compound which is to be decomposed.

Still other methods of combining the three essential components of the new catalyst can, of course, be used. It is also feasible to incorporate into these catalysts other materials which may be useful to their operation.

The following examples further illustrate suitable methods for making the new catalysts and show some of their advantages.

EXAMPLE I

A catalyst composed of ruthenium on a alumina carrier with iodic acid as oxidizer was prepared by first immersing 6–8 mesh Reynolds RA–1 alumina granules in an aqueous solution containing 2.5 grams of ruthenium as the trichloride per 145 ml. This carrier had a surface area of 250 square meters per gram and a pore volume of 0.20 cc. per gram. 250 grams of the carrier were soaked in the solution for 5 minutes, then dried and decomposed in hot air for 60 minutes. The dried granules were then heated for 20 minutes at 200° C. in nitrogen, then in a nitrogen-hydrogen mixture, and finally in hydrogen alone at 500° C. The ruthenium metal coated alumina was cooled. A 174 g. portion of the resulting material was immersed in water and drained and then mixed with 50 grams of iodic acid which dissolved so the adsorbed iodic acid was on the outer portion of the granular substrate. This product was then carefully dried at 140° C. to remove water without converting the acid to anhydride. The catalyst obtained weighed 231 grams and contained 21% $HIO_3$ and 0.8% metallic ruthenium.

The catalyst was used to decompose hydrazine in a five-pound thrust reactor having a cylindrical catalyst bed 1.04 inches in diameter by 3.5 inches long. At the normal feed rates 6 to 10 grams of hydrazine entered in the first 500 milliseconds and fired well at 2 to 4° C. with an ignition delay of only about 45 to 75 milliseconds.

After 6.2 seconds the feed was shut off and another test after a 12.3 second interval fired equally well. Repeated good starts can thus be obtained provided catalyst temperature does not drop below about 100° C.

The above catalyst may be contrasted with the same catalyst, made in the same way with the same support, containing 1% wt. ruthenium without oxidizer, which would not fire at the starting temperature of this test.

EXAMPLE II

A similar catalyst made with the same catalyst carrier but with 17.2% iodic acid and 1.3% ruthenium also gave good results in the same reactor. It fired well at 12° C. starting temperature, and thereafter gave good repeated starts.

EXAMPLE III

Good results were also obtained with a catalyst made in the same way using a cellular ceramic carrier, "cercor," as carrier in cylindrical forms on which was deposited 12% iridium and 8.1% iodic acid. There was essentially no ignition delay in the successive starts with pulse intervals of about 5 to 7 seconds.

EXAMPLE IV

Similar good results have been obtained with catalysts made in an analogous way but using ammonium dichromate as oxidant.

EXAMPLE V

Catalysts made in the same way but substituting platinum or palladium as the catalyst metal and/or silver chromate or $CrO_3$ as oxidizer, give rapid low temperature starts in the same reactor.

Instead of hydrazine, substituted hydrazines such as monomethyl hydrazine unsymmetrical dimethyl hydrazine, and the like can be decomposed with the new catalysts in the same way.

These hydrozines can be used as the individual compounds or as blends of two or more of these compounds. The individual hydrazines or their blends can be used with various other materials, particularly soluble materials which lower the freezing point and/or have other desirable effects. Thus water, ammonia, hydroxylamine and/or methanol are suitable additives, for example, and hydrazinium nitrate and/or hydrazinium perchlorate, or the like can be used not only for freezing point lowering, but also to provide extra energy, and maintain or increase impulse.

Instead of using the new catalysts alone, they can be used in combination with other hydrazine decomposition catalysts. One advantageous form of combination catalyst makes use of the new platinum metal and axidizer-containing catalyst in series with a conventional hydrazine decomposition catalyst. As conventional catalysts one can use platinum group metals without oxidizers as described in the previously mentioned patents, or mixtures of cobalt, copper and alkali metals or their oxides as described in U.S. Pat. 2,925,709. Iron, cobalt and nickle alone or in combination can likewise be used. Whatever the catalyst chosen for use with the new catalysts of the invention, superior results are obtained by employing the new hypergolic catalysts at the inlet end of the reactor so the hydrazine first contacts the new catalyst which is followed by hydrazine decomposition catalyst of conventional composition. In this way, the advantages of the invention can often be obtained with smaller amounts of the new catalysts. It will thus be seen that the invention has many advantages, and is capable of wide variation. It is not restricted to the examples which have been given by way of illustration, nor by any theory proposed in explanation of the improved results which are obtained.

We claim as our invention:

1. A catalyst for hydrazine decomposition consisting essentially of an inert, inorganic carrier having a pore volume of at least 0.1 cubic centimeters per gram and a specific surface area of at least 10 meters per gram, having deposited thereon platinum group metal in an amount between about 0.2% and about 4% by weight, and incorporating iodic acid in an amount providing about 1% to about 20% active oxygen based on the total weight of the catalyst.

2. A catalyst in accordance with claim 1 having as the catalytic metal a member of the group consisting of ruthenium, iridium and mixtures of ruthenium and iridium.

3. A catalyst in accordance with claim 1 having an alumina support.

4. A catalyst in accordance with claim 2 consiting essentially of ruthenium on an alumina support with iodic acid.

5. A catalyst in accordance with claim 4 containing 0.5 to 2% by weight ruthenium and 10% to 30% iodic acid.

References Cited

UNITED STATES PATENTS

| 3,021,667 | 2/1962 | Griffin et al. | 60—209 X |
| 3,081,595 | 3/1963 | Rose | 60—217 |
| 3,212,255 | 10/1965 | Putt et al. | 60—218 |

CARL D. QUARFORTH, Primary Examiner

S. J. LECHERT, Jr., Assistant Examiner

U.S. Cl X.R.

252—466 PT, 472; 149—36; 60—218